US011087928B2

United States Patent
Ishimaru et al.

(10) Patent No.: US 11,087,928 B2
(45) Date of Patent: Aug. 10, 2021

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Yoshiaki Ishimaru, Saga (JP); Kazunari Imamoto, Yamaguchi (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 106 days.

(21) Appl. No.: 16/359,482

(22) Filed: Mar. 20, 2019

(65) Prior Publication Data

US 2019/0304704 A1 Oct. 3, 2019

(30) Foreign Application Priority Data

Mar. 30, 2018 (JP) .............................. JP2018-069367

(51) Int. Cl.
*H01G 9/042* (2006.01)
*H01G 9/15* (2006.01)
*H01G 9/00* (2006.01)
*H01G 9/028* (2006.01)
*H01G 9/048* (2006.01)
*H01G 9/145* (2006.01)

(52) U.S. Cl.
CPC ......... *H01G 9/0425* (2013.01); *H01G 9/0036* (2013.01); *H01G 9/028* (2013.01); *H01G 9/042* (2013.01); *H01G 9/048* (2013.01); *H01G 9/145* (2013.01); *H01G 9/151* (2013.01)

(58) Field of Classification Search
CPC .... H01G 9/0425; H01G 9/151; H01G 9/0036; H01G 9/028; H01G 9/048; H01G 9/042; H01G 9/145; H01G 11/28; H01G 11/26; H01G 11/22; H01G 11/24
USPC ................................ 361/516, 523, 532, 502
See application file for complete search history.

(56) References Cited

U.S. PATENT DOCUMENTS

| | | | | |
|---|---|---|---|---|
| 2013/0329340 A1* | 12/2013 | Okuzawa | ............... | H01G 11/28 361/502 |
| 2013/0330617 A1 | 12/2013 | Yoshimura et al. | | |
| 2018/0082798 A1* | 3/2018 | Tsuda | ..................... | H01G 11/52 |

FOREIGN PATENT DOCUMENTS

JP 2012-174865 9/2012

* cited by examiner

*Primary Examiner* — Arun Ramaswamy
(74) *Attorney, Agent, or Firm* — McDermott Will and Emery LLP

(57) ABSTRACT

An electrolytic capacitor includes an anode body including a dielectric layer, a cathode body, and a conductive polymer layer and a liquid component that are disposed between the anode body and the cathode body. The cathode body includes a base material part having an outer surface that is roughened surface and has a pore opened at the outer surface, and an inorganic conductive layer covering at least a part of the outer surface. The base material part includes a first coating layer disposed along at least a part of inner wall of the pore. The first coating layer contains phosphorus.

7 Claims, 2 Drawing Sheets

ELECTROLYTIC CAPACITOR AND METHOD FOR MANUFACTURING SAME

BACKGROUND

1. Technical Field

The present disclosure relates to an electrolytic capacitor and a method for manufacturing the electrolytic capacitor.

2. Description of the Related Art

As small-sized, large capacitance, and low equivalent series resistance (ESR) capacitors, promising candidates are electrolytic capacitors that include an anode foil having a dielectric layer, and a cathode body, and that include a conductive polymer attached to the dielectric layer.

In an electrolytic capacitor including an electrolytic solution, the cathode body has, so as to be suitable for use application of the electrolytic capacitor, a form including a roughened metal foil and an anodized foil obtained by further subjecting the roughened metal foil to anodization, or a form including a metal foil on whose surface a non-valve metal such as titanium is formed.

Meanwhile, in an electrolytic capacitor including a solid electrolyte, the cathode body also has, other than the cathode foils described above, a form including a metal foil on whose surface a carbon layer or titanium nitride is formed as a conductive layer.

Unexamined Japanese Patent Publication No. 2012-174865 discloses use, as the cathode foil for the solid electrolytic capacitor, of a non-roughened electrode base material on whose surface a first conductive layer, a mixture layer made of a mixture of a substance constituting the first conductive layer with carbon, and a second conductive layer substantially made of carbon. The mixture layer is configured to change the component concentration of the mixture layer from a component composition that substantially includes only the substance constituting the first conductive layer to a component composition that substantially includes only carbon, from the first conductive layer toward the second conductive layer.

SUMMARY

An electrolytic capacitor according to a first aspect of the present disclosure includes an anode body including a dielectric layer, a cathode body, and a conductive polymer layer and a liquid component that are disposed between the anode body and the cathode body. The cathode body includes a base material part having an outer surface that is roughened surface and has a pore opened at the outer surface, and an inorganic conductive layer covering at least a part of the outer surface. The base material part at least includes a first coating layer disposed along at least a part of inner wall of the pore. The first coating layer contains phosphorus.

A method for manufacturing an electrolytic capacitor according to a second aspect of the present disclosure includes following first to fifth steps. The first step is preparing a cathode body including a base material part having an outer surface that is roughened surface and has a pore opened at the outer surface, and an inorganic conductive layer covering at least a part of the outer surface. The second step is forming a wound body that includes the cathode body, an anode body having a dielectric layer, and a separator interposed between the cathode body and the anode body. The third step is attaching a phosphorus-containing compound layer to at least a part of inner wall of the pore in the cathode body. The fourth step is forming a capacitor element by attaching a conductive polymer to cover at least a part of the dielectric layer. The fifth step is impregnating the capacitor element with a liquid component.

According to the present disclosure, it is possible to reduce the ESR of the electrolytic capacitor.

DETAILED DESCRIPTION OF EMBODIMENT

Figure 1:
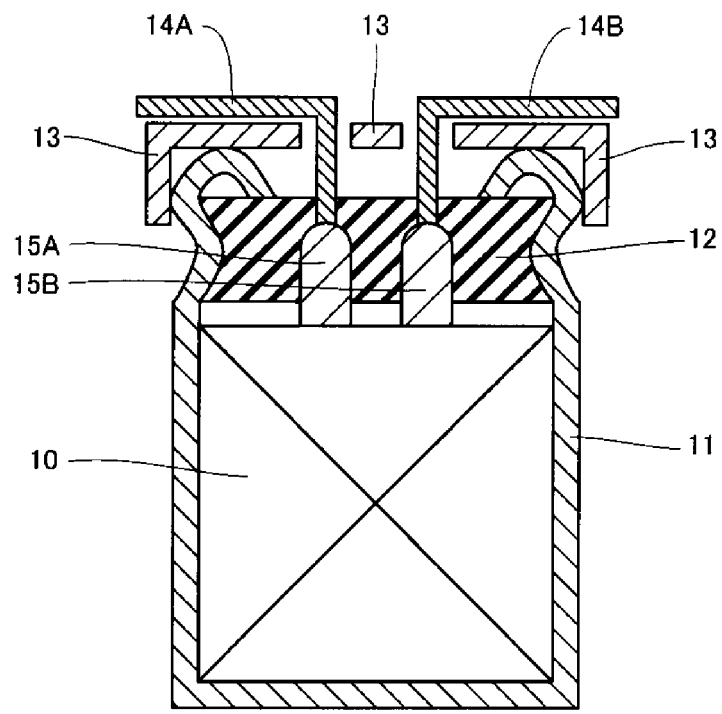
FIG. 1 is a cross-sectional view schematically illustrating an electrolytic capacitor according to one exemplary embodiment of the present disclosure.

In an electrolytic capacitor including a conductive polymer as a solid electrolyte, a cathode body obtained by forming an inorganic conductive layer such as a carbon layer on a surface of a foil is proposed so as to reduce ESR between the conductive polymer and the cathode body. However, in a hybrid electrolytic capacitor including the conductive polymer as the solid electrolyte and a liquid component (electrolytic solution) in combination, the liquid component can infiltrate between the inorganic conductive layer and the foil. This makes the liquid component reactive in an interface between the foil and the inorganic conductive layer to easily generate gas and increase degradation by oxidation of the metal foil. In addition, the liquid component tends to inhibit contact between the conductive polymer layer and the inorganic conductive layer. As a synergistic result of these phenomena, the equivalent series resistance (ESR) easily increases.

Particularly, when the conductive layer is formed on a roughened foil to increase adhesiveness between the conductive polymer and the cathode body, an inorganic conductive layer is unlikely to be formed as far as inner portions of pores of the foil. This makes the electrolytic solution easily contact with a surface of the foil at deep portions of the pores to easily degrade the foil. On the surface of the foil, a natural oxide coating film can be formed. The natural oxide coating film, however, is not capable of giving sufficient water resistance to easily allow a progress in degradation of the foil by a hydration reaction when the liquid component contains moisture. This results in an easy increase in ESR.

[Electrolytic Capacitor]

An electrolytic capacitor according to one exemplary embodiment of the present disclosure includes an anode body including a dielectric layer, a cathode body, and a conductive polymer layer and a liquid component that are disposed between the anode body and the cathode body. The cathode body includes a base material part having an outer surface that is roughened surface and has a pore opened at the outer surface, and an inorganic conductive layer covering at least a part of the outer surface. The base material part includes a first coating layer disposed along at least inner wall of the pore. The first coating layer contains phosphorus.

That is, the electrolytic capacitor is a hybrid electrolytic capacitor including a liquid component (an electrolytic solution or a solvent) and a conductive polymer as electrolytes. In the present exemplary embodiment, a surface of the base material part constituting the cathode body is roughened and pores are formed on an outer surface of the base material part. Hereinafter, a porous body portion refers to a portion on the surface of the base material where the pores are formed, and a core material portion refers to an inner portion of the base material part where no pores are formed.

A phosphorus-containing layer (first coating layer) (hereinafter, sometimes referred to as a "phosphorus compound layer") is disposed along inside walls of the pores to coat a ground metal portion of the base material part. The phosphorus compound layer has high solvent resistance to various solvents (particularly, moisture) constituting the liquid component (electrolytic solution). This is unlikely to allow direct contact between the liquid component and a material (for example, a metallic material) constituting the base material part even when the liquid component comes into the pores. Hence, generation of gas caused by decomposition of the liquid component that has infiltrated into the pores is suppressed, and as well as degradation of the metallic material is suppressed.

Particularly, when an acidic liquid component, which has a pH of less than 7, is in contact with the ground metal, the cathode body, for example, corrodes to easily cause degradation. Hence, the formation of the first coating layer to cover the ground metal is capable of suppressing degradation of the cathode body. Providing the first coating layer is capable of giving an excellent effect of suppressing degradation of the cathode body even when the liquid component has a pH of less than 5. In addition, the first coating layer containing phosphorus is capable of increasing humidity resistance even in a high-temperature and high-humidity use environment, which is a temperature of higher than or equal to 85° C. and a humidity of higher than or equal to 85%, for example.

In addition, the first coating layer containing phosphorus is capable of suppressing a hydration reaction of the ground metal when the liquid component contains water. For example, the liquid component may contain moisture in a range from 3% by mass to 15% by mass, inclusive. Even in such a case, the first coating layer containing phosphorus suppresses the hydration reaction. Accordingly, providing the first coating layer is capable of suppressing degradation of the cathode body even when the liquid component contains moisture.

On the other hand, in the cathode body, an outer surface that has no open pores is covered with an inorganic conductive layer. The inorganic conductive layer contains, for example, conductive carbon. The inorganic conductive layer may further cover a part of the inner walls of the pores. For example, a gas phase method such as vacuum vapor deposition or sputtering is unlikely to form the inorganic conductive layer in the pores of the metal foil. Accordingly, the inorganic conductive layer is formed to cover at least a part of the outer surface of the cathode body.

The inorganic conductive layer formed on the outer surface is in contact with the conductive polymer layer and is electrically connected to the core material portion of the base material part via the outer surface between the inorganic conductive layer and the core material portion. This configuration is capable of reducing resistance generated between the conductive polymer layer and the core material portion. Accordingly, it is possible to reduce the ESR of the electrolytic capacitor. In addition, the cathode body that substantially functions as a conductor is capable of suppressing a decrease in capacitance of the electrolytic capacitor.

The conductive polymer layer also comes into the pores of the cathode body. In the present exemplary embodiment, the formation of the phosphorus compound layer on the inside walls of the pores makes a conductive polymer easily come into the pores to achieve easy adhesion of the conductive polymer layer to the cathode body. The adhesion between the conductive polymer layer and the cathode body in the pore portions enlarging surface area is capable of increasing adhesiveness between the conductive polymer layer and the foil, so that the ESR can be further reduced.

It is possible to attach the phosphorus compound layer to the inside walls of the pores by, for example, impregnating a roughened cathode body with a solution containing a phosphorus compound (phosphorus solution) and then drying the cathode body by a heat treatment. The impregnation with the phosphorus solution may be performed simultaneously or concurrently with anodizing an end surface of the anode body again or anodizing the cathode body to form an oxide coating film along the inside walls of the pores, when an anodizing treatment solution contains phosphorus compound.

The base material part may be one obtained by roughening a foil on which a natural oxide film has been formed and forming the inorganic conductive layer to cover at least a part of an outer surface of the foil. Alternatively, the base material part may be one obtained by forming the inorganic conductive layer to cover at least a part of an outer surface of a foil that has been subjected to roughening and then an anodizing treatment. In these cases, an oxide coating film (second coating layer) is formed along the outer surface of the base material part and the second coating layer can be interposed between the ground metal of the base material part and the inorganic conductive layer. Both the first coating layer and the second coating layer include an oxide of the same metal and can be continuously and integrally formed. In these cases, the phosphorus compound layer (first coating layer) formed on the inside walls of the pores may be formed to have a film thickness greater than a film thickness of the second coating layer.

The base material part may also be one obtained by forming the phosphorus compound layer on a roughened foil and forming the inorganic conductive layer on an outer surface of the phosphorus compound layer. In this case, an outer surface of the base material part can be coated with a phosphorus-containing layer (second coating layer) to allow interposition of the phosphorus-containing second coating layer between the outer surface of the base material part and the inorganic conductive layer. In this case, the phosphorus compound layer (first coating layer) on the inside walls of the pores may be formed to have a phosphorus content ratio (concentration) higher than a phosphorus content ratio (concentration) of the second coating layer. Here, the phosphorus content ratio (concentration) means a phosphorus concentration in terms of atomic fraction.

The first coating layer has a phosphorus concentration ranging preferably from 0.5 at % to 7.0 at %, inclusive, more preferably from 1.0 at % to 5.0 at %, inclusive, for example, from a viewpoint of suppressing degradation of the cathode body.

Phosphorus content concentrations of the first and second coating layers are determined by observing a cross-section cut along a thickness direction of the cathode body with a transmission electron microscope (TEM) and analyzing composition in a desired region of the cathode body with an X-ray microanalyzer (XMA). Comparison in phosphorus content concentration between the first coating layer and the second coating layer may be performed by averaged phosphorus content concentrations each obtained from a plurality of points measured along the thickness direction. For example, the comparison may be performed by averaged phosphorus content concentrations each obtained from three locations of the cathode body, which are a location close to the surface, a location close to the base material part, and a location in a middle between the surface and the base material part.

The first coating layer may have a film thickness ranging, for example, from 1 nm to 100 nm, inclusive, and may further have a film thickness ranging from 3 nm to 30 nm, inclusive. When the base material part includes the second coating layer, the second coating layer may have a film thickness ranging, for example, from 1 nm to 10 nm, inclusive.

When the cathode body obtained by forming the inorganic conductive layer on a roughened and anodized foil is impregnated with the phosphorus solution to form the phosphorus compound layer, a following heat treatment can diffuse phosphorus attached to the inside walls of the pores into an anodizing oxide coating film to form a phosphorus-containing oxide coating film (first coating layer) along the inside walls of the pores. The film thickness of the first coating layer becomes greater than a film thickness of the anodizing oxide coating film formed on the outer surface of the cathode body because the first coating layer contains phosphorus.

Preferably, the phosphorus compound layer may also be formed by forming the inorganic conductive layer on a roughened outer surface of the base material part and then subjecting the base material part to anodization with a treatment solution containing phosphorus. This procedure provides an oxide coating film on the inside walls of the pores and diffuses phosphorus into the oxide coating film to form a phosphorus-containing oxide coating film. On the other hand, this procedure is unlikely to form the oxide coating film on the outer surface covered with the inorganic conductive layer. Even when a natural oxide film is formed on the outer surface, phosphorus is unlikely to infiltrate into the natural oxide film covered with the inorganic conductive layer. Accordingly, it is possible to easily obtain the first coating layer having a film thickness greater than the film thickness of the second coating layer and/or having a phosphorus content ratio higher than the phosphorus content ratio of the second coating layer.

The cathode body that has been anodized and on which the inorganic conductive layer has been formed may be again subjected to anodization with an anodizing treatment solution containing phosphorus. In this case, a voltage applied to a cathode during the anodization may be higher or lower than a voltage applied in the anodizing treatment on the base material part. When the re-anodization is performed at a voltage lower than the voltage applied in the anodizing treatment on the base material part, the oxide coating film never further grows but the diffusion of phosphorus into the oxide coating film is accelerated. This enables formation of the first coating layer that is thicker than the second coating layer and/or has a phosphorus content ratio higher than the phosphorus content ratio of the second coating layer.

The inorganic conductive layer may have a phosphorus-attached region on an outer surface of the inorganic conductive layer. The formation of the phosphorus compound layer on the inside walls of the pores after the formation of the inorganic conductive layer can make the phosphorus compound layer attach also to the outer surface of the inorganic conductive layer. The phosphorus compound layer is capable of coating a crack that can be present on the outer surface of the inorganic conductive layer.

Generation of a crack on the inorganic conductive layer allows infiltration of the liquid component into the core material portion of the foil (base material part) through the crack to easily degrade the base material part. This results in generation of a portion having high resistance on the outer surface of the base material part to easily increase the ESR. The formation of the phosphorus compound layer after the formation of the inorganic conductive layer, however, is capable of covering the inside walls of the pores with the phosphorus compound layer and covering a crack generated on the inorganic conductive layer with the phosphorus compound layer. This enables suppression of a rise in ESR caused by degradation of the foil and thus maintenance of a low ESR. In this case, the phosphorus compound layer can be formed to bury the crack that can be present in the inorganic conductive layer.

In manufacturing of the electrolytic capacitor, particularly when the anode body and the cathode body are stacked with a separator interposed between the anode body and the cathode body to form a wound body, a crack is easily generated on the inorganic conductive layer of the formed wound body. Accordingly, the phosphorus compound layer may be formed, after the formation of the wound body, by impregnating the wound body with a solution containing phosphorus compound.

The first coating layer may be one containing a metal oxide and phosphorus. The metal oxide may be an oxide of a metal constituting the core material portion of the cathode body. As described above, even the formation of the oxide coating film on the inner walls of the pores in the porous body portion enables the electrolytic capacitor to maintain a high capacitance. Further, the formation of the oxide coating film on the inner walls is capable of further increasing chemical stability to the liquid component to synergistically suppress a reaction with the liquid component.

On an anode side of the electrolytic capacitor, the liquid component has an action of increasing repairability of the dielectric layer formed on a surface of the anode body. On a cathode side of the electrolytic capacitor, however, the liquid component contacts with a surface where the ground metal of the cathode body is exposed, to easily oxidize the cathode body and thus easily form a dielectric layer on the surface of the cathode body. This results in an easy decrease in combined capacitance of the electrolytic capacitor. In the electrolytic capacitor according to the present exemplary embodiment, the inorganic conductive layer is formed on an outer surface layer of the cathode body, so that the combined capacitance of the electrolytic capacitor does not decrease even when the dielectric layer is formed along the inner walls of the pores. Rather, the formation of the dielectric layer as the oxide coating film on the inside walls is capable of increasing an effect of suppressing corrosion of the foil or generation of gas caused by reductive decomposition of the liquid component, as a result of a reaction of the metal constituting the cathode body with the liquid component.

Main surfaces of a cathode foil (cathode body) or an anode foil (anode body) are two surfaces that account for largest areas among surfaces of the electrode foil. End surfaces of the cathode foil or the anode foil are surfaces that are other than the main surfaces of the electrode foil and exist at ends of the electrode foil. When a large electrode foil is cut, the end surfaces also include a cut surface. In the wound body, the end surfaces are surfaces of the electrode foil that are provided as a top surface and a bottom surface other than a peripheral surface of the wound body.

Hereinafter, the present exemplary embodiment is more specifically described with appropriate reference to drawings. The exemplary embodiment described below, however, is not to limit the present disclosure.

Figure 2:
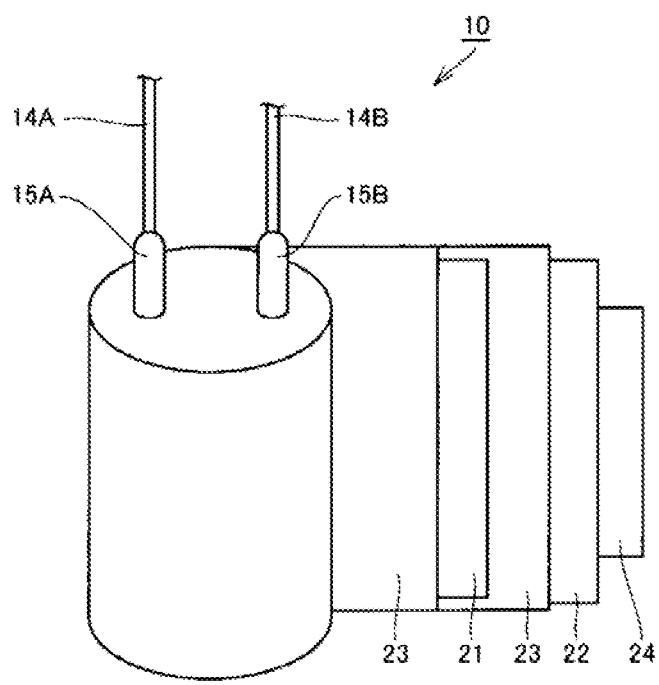
FIG. 2 is a schematic partially developed view of a wound body included in the electrolytic capacitor.

FIG. 1 is a schematic cross-sectional view illustrating the electrolytic capacitor according to the present exemplary embodiment, and FIG. 2 is a schematic partially developed view of a wound body included in the electrolytic capacitor.

As shown in FIG. 1, the electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are lead out from sealing member 12 and penetrate base plate 13, lead tabs 15A, 15B that connect the lead wires to electrodes of capacitor element 10, respectively, and a liquid component (not shown). Capacitor element 10 is housed in bottomed case 11 together with the liquid component. Bottomed case 11 is, at a part near an opening end, processed inward by drawing, and is, at the opening end, curled to swage sealing member 12.

Capacitor element 10 is produced by, for example, attaching a conductive polymer to a wound body shown in FIG. 2. The wound body includes anode body 21 having a dielectric layer, cathode body 22 that contains a first metal having a valve action, and separator 23 disposed between the anode body and the cathode body. The conductive polymer is attached to cover at least a part of a surface of the dielectric layer in anode body 21. Capacitor element 10 further includes lead tab 15A connected to anode body 21 and lead tab 15B connected to cathode body 22.

Anode body 21 and cathode body 22 are wound with separator 23 interposed between the anode body and the cathode body. An outermost periphery of the wound body is fixed with fastening tape 24. FIG. 2 shows the wound body that is partially developed before the outermost periphery of the wound body is fixed. Anode body 21 includes a metal foil whose surface is roughened to have projections and recesses, and the dielectric layer is formed on a main surface of the metal foil having the projections and recesses.

Hereinafter, a configuration example of the electrolytic capacitor is described in detail.

(Cathode Body)

Figure 3:
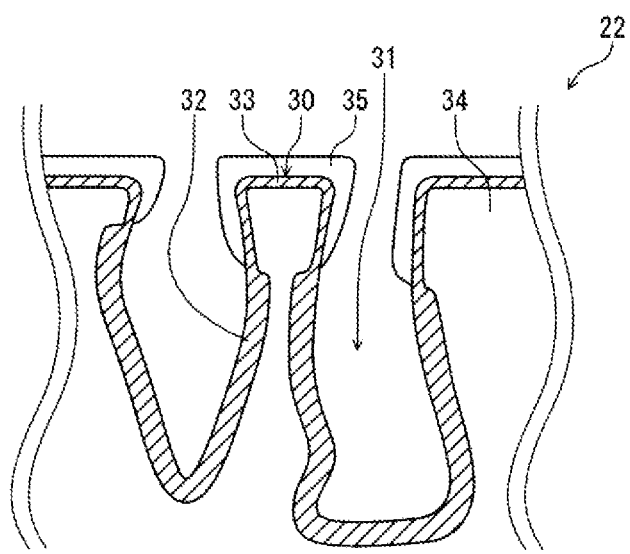
FIG. 3 is a cross-sectional view schematically illustrating a configuration of a cathode body used in the electrolytic capacitor.

FIG. 3 shows an enlarged cross-sectional view illustrating one exemplary porous body portion of a cathode body used in the electrolytic capacitor according to the present exemplary embodiment.

As shown in FIG. 3, cathode body 22 includes base material part 34 whose main surface is roughened and the roughened main surface has open pores 31 on outer surface 30 of the roughened main surface. At least a part of outer surface 30 is covered with inorganic conductive layer 35. On the other hand, oxide coating film (first coating layer) 32 is formed along inner walls of the pores. Oxide coating film 32 contains phosphorus.

Oxide coating film (second coating layer) 33 is formed along outer surface 30 and is coated with inorganic conductive layer 35. In this example, both oxide coating films 32 and 33 are formed by an anodizing treatment. And oxide coating films 32 and 33 are continuously and integrally formed. Oxide coating film 32, however, has a film thickness greater than a film thickness of oxide coating film 33. Oxide coating film 33 contains no phosphorus or has a phosphorus concentration lower than a phosphorus concentration of oxide coating film 32.

Inorganic conductive layer 35 may have crack C (not shown). When inorganic conductive layer 35 has crack C, outer surface 30 of the cathode body may be exposed through crack C. The outer surface that is exposed through crack C, however, is a surface coated with the phosphorus-containing layer.

A conductive polymer layer comes into the pores of cathode body 22 in manufacturing of the electrolytic capacitor.

A metal foil can be used for the cathode body. A type of a metal contained in the metal foil is not particularly limited. The metal, however, is preferably a metal (first metal) having a valve action, such as aluminum, tantalum, or niobium. Especially, a metallic material is preferable that contains the first metal as a main component. Examples of such a metallic material include an elemental first metal and a first metal-containing alloy.

The roughening for the cathode body is preferably performed by subjecting the metal foil to an etching treatment. In addition, an oxide coating film may be formed on a surface of the cathode body by subjecting the cathode body to an anodizing treatment as necessary.

(Inorganic Conductive Layer)

The inorganic conductive layer is desired to be, as a whole layer, formed of an inorganic material having conductivity and is distinguished from the conductive polymer layer made of an organic material.

Examples of the conductive inorganic material that constitutes the inorganic conductive layer include, in addition to conductive carbon, a metal and a conductive metal compound. Examples of the conductive carbon include amorphous carbon, carbon black such as acetylene black, soft carbon, hard carbon, graphite, and a carbon fiber such as a carbon nanotube. As the metal and the metal compound, preferred is one that is less likely to form a passive film by, for example, contacting with air. Examples of the metal include titanium, a titanium alloy, nickel, and a nickel alloy. Examples of the metal compound include a nitride and a carbide, and a nitride is preferable. As a metal that constitutes the metal compound, there can be exemplified titanium and/or nickel. The inorganic conductive layer may contain one or two or more of these inorganic materials.

Although the inorganic conductive layer may contain the conductive inorganic material and a binder, a ratio of the conductive inorganic material is preferably as high as possible. A content proportion of the conductive inorganic material in the inorganic conductive layer is preferably greater than or equal to 95% by mass or greater than or equal to 99% by mass, for example. In addition, the inorganic conductive layer may be a layer made of the conductive inorganic material. The inorganic conductive layer may be one formed by performing a heat treatment to a layer containing the conductive inorganic material and a binder so as to remove the binder. Especially, the inorganic conductive layer is preferably a deposited film of the conductive inorganic material (particularly, conductive carbon such as amorphous carbon).

Even when the cathode body and the inorganic conductive layer are formed of the same metal, a distribution of the metal in the inorganic conductive layer is different from a distribution of the metal in the cathode body (for example, the distribution of the metal is rougher in the inorganic conductive layer than in the cathode body). Thus, it is possible to distinguish the cathode body from the inorganic conductive layer, for example, in a cross-sectional electron micrograph.

From a viewpoint of increasing adhesiveness between the inorganic conductive layer and the cathode body, the inorganic conductive layer may further include a conductive base layer as necessary. The base layer that constitutes a part of the inorganic conductive layer preferably contains, for example, a conductive inorganic material such as a metal or a conductive metal compound among the conductive inorganic materials exemplified above. As the metal, titanium is preferable, and as the metal compound, titanium nitride is preferable.

The inorganic conductive layer has a thickness ranging, for example, from 1 nm to 10 μm, inclusive. When the inorganic conductive layer is a deposited film, the inorganic conductive layer may have a thickness ranging, for example, from 1 nm to 100 nm, inclusive. When the inorganic conductive layer is formed from a layer containing the conductive inorganic material and a binder, the inorganic conductive layer may have a thickness ranging, for example, from 100 nm to 10 μm, inclusive. The thickness of the inorganic conductive layer may be defined as an average thickness obtained by averaging thicknesses measured at a plurality of locations (for example, 10 locations) in a cross-sectional image.

When the inorganic conductive layer has a thickness in the above range, a decrease in adhesiveness between the inorganic conductive layer and the conductive polymer layer can be easily suppressed, so that high conductivity can be easily secured.

(Anode Body)

A metal foil can be used for the anode body. A type of a metal contained in the metal foil is not particularly limited. The metal, however, is preferably a metal (second metal) having a valve action, such as aluminum, tantalum, niobium, or titanium, in terms of facilitating formation of the dielectric layer. Especially, a metallic material is preferable that contains the second metal as a main component, such as an elemental metal (e.g., aluminum) and an alloy (e.g., an aluminum alloy). A surface of the anode body is roughened and the dielectric layer is formed on the roughened surface of the metal foil.

(Separator)

As a material for the separator, it is possible to use a nonwoven fabric or a film that contains, as a main component, for example, cellulose, polyethylene terephthalate, polybutylene terephthalate, polyphenylenesulfide, vinylon, nylon, aromatic polyamide, polyimide, polyamideimide, polyetherimide, rayon, or a vitreous material.

(Conductive Polymer)

The conductive polymer is preferably polypyrrole, polythiophene, or polyaniline, for example. These conductive polymers may be used alone, or two or more of these conductive polymers may be used in combination, or a copolymer of two or more monomers may be used. A weight-average molecular weight of the conductive polymer is not particularly limited and ranges, for example, from 1000 to 100000, inclusive.

In the present specification, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like can also include derivatives of polypyrrole, polythiophene, polyaniline, and the like, respectively. For example, polythiophene includes poly(3, 4-ethylenedioxythiophene) (PEDOT) and the like.

A dopant may be added to the conductive polymer. It is preferable to use a polymer dopant, from a viewpoint of suppressing dedoping of the dopant from the conductive polymer. Examples of the polymer dopant include polyanions of polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polymer dopants may be used alone, or two or more of these dopants may be used in combination. These polymer dopants may be a homopolymer or a copolymer of two or more monomers. Particularly, polystyrenesulfonic acid (PSS) is preferable.

A weight-average molecular weight of the dopant is not particularly limited but preferably ranges, for example, from 1000 to 100000, inclusive, in terms of facilitating formation of a homogeneous solid electrolyte layer.

(Liquid Component)

The liquid component may be a nonaqueous solvent or a mixture of a nonaqueous solvent and an ionic substance (a solute such as an organic salt) dissolved in the nonaqueous solvent (that is, an electrolytic solution). The nonaqueous solvent may be an organic solvent or an ionic liquid. The nonaqueous solvent is preferably a high boiling point solvent. As the nonaqueous solvent, it is possible to use, for example, polyols such as ethylene glycol and propylene glycol, cyclic sulfones such as sulfolane (SL), lactones such as γ-butyrolactone (γBL), amides such as N-methylacetamide, N,N-dimethylformamide, and N-methyl-2-pyrrolidone, esters such as methyl acetate, carbonate compounds such as propylene carbonate (PC), ethers such as 1,4-dioxane, ketones such as methyl ethyl ketone, and formaldehyde. A polymer solvent may also be used as the high boiling point solvent.

Examples of the polymer solvent include a polyalkylene glycol, a derivative of a polyalkylene glycol, and a compound obtained by substituting at least one hydroxy group of a polyol with a polyalkylene glycol (including a derivative). Specific examples of the polymer solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. These polymer solvents may be used alone, or two or more of these polymer solvents may be used in mixture. The polymer solvent may be a solvent such as an ethylene glycol-propylene glycol copolymer, an ethylene glycol-butylene glycol copolymer, or a propylene glycol-butylene glycol copolymer. The copolymer may be a random copolymer. The liquid component may also contain an acid component and a base component.

As the acid component, it is possible to use a polycarboxylic acid and a monocarboxylic acid.

Examples of the polycarboxylic acid include aliphatic polycarboxylic acids ([saturated polycarboxylic acids such as oxalic acid, malonic acid, succinic acid, glutaric acid, adipic acid, pimelic acid, suberic acid, azelaic acid, sebacic acid, 1,6-decanedicarboxylic acid, and 5,6-decanedicarboxylic acid]; and [unsaturated polycarboxylic acids such as maleic acid, fumaric acid, and itaconic acid]), aromatic polycarboxylic acids (such as phthalic acid, isophthalic acid, terephthalic acid, trimellitic acid, and pyromellitic acid), and alicyclic polycarboxylic acids (such as cyclohexane-1,2-dicarboxylic acid and cyclohexene-1,2-dicarboxylic acid).

Examples of the monocarboxylic acid include aliphatic monocarboxylic acids (1 to 30 carbon atoms) ([saturated monocarboxylic acids such as formic acid, acetic acid, propionic acid, butyric acid, isobutyric acid, valeric acid, caproic acid, enanthic acid, caprylic acid, pelargonic acid, lauric acid, myristic acid, stearic acid, and behenic acid]; and [unsaturated monocarboxylic acids such as acrylic acid, methacrylic acid, and oleic acid]), aromatic monocarboxylic acids (such as benzoic acid, cinnamic acid, and naphthoic acid), and oxycarboxylic acids (such as salicylic acid, mandelic acid, and resorcinol acid).

Especially, maleic acid, phthalic acid, benzoic acid, pyromellitic acid, or resorcinol acid is preferably used because these acids have high conductance and are thermally stable.

Examples of an inorganic acid include a carbon compound, a hydrogen compound, a boron compound, a sulfur compound, a nitrogen compound, and a phosphorus compound. Typical examples of the inorganic acid include phosphoric acid, phosphorous acid, hypophosphorous acid, alkyl phosphoric acid ester, boric acid, fluoroboric acid, tetrafluoroboric acid, hexafluorophosphoric acid, benzenesulfonic acid, and naphthalenesulfonic acid.

As the acid component, it is possible to use a composite compound of an organic acid and an inorganic acid. Examples of the composite compound include borodiglycolic acid, borodioxalic acid, and borodisalicylic acid.

Examples of the base component include compounds having an alkyl-substituted amidine group, such as an imidazole compound, a benzimidazole compound, and an alicyclic amidine compound (e.g., a pyrimidine compound and an imidazoline compound). Specifically, preferred are 1,8-diazabicyclo[5,4,0]undecene-7, 1,5-diazabicyclo[4,3,0]nonene-5, 1,2-dimethylimidazolinium, 1,2,4-trimethylimidazoline, 1-methyl-2-ethylimidazoline, 1,4-dimethyl-2-ethylimidazoline, 1-methyl-2-heptylimidazoline, 1-methyl-2-(3'heptyl)imidazoline, 1-methyl-2-dodecylimidazoline, 1,2-dimethyl-1,4,5,6-tetrahydropyrimidine, 1-methylimidazole, and 1-methylbenzimidazole that have high conductance and are capable of providing a capacitor excellent in impedance performance.

As the base component, it is also possible to use a quaternary salt of the compound having an alkyl-substituted amidine group, and examples of the quaternary salt include an imidazole compound, a benzimidazole compound, and an alicyclic amidine compound (e.g., a pyrimidine compound and an imidazoline compound) that are quaternized by an alkyl group or an arylalkyl group having 1 to 11 carbon atoms. Specifically, preferred are 1-methyl-1,8-diazabicyclo[5,4,0]undecene-7, 1-methyl-1,5-diazabicyclo[4,3,0]nonene-5, 1,2,3-trimethylimidazolinium, 1,2,3,4-tetramethylimidazolinium, 1,2-dimethyl-3-ethyl-imidazolinium, 1,3,4-trimethyl-2-ethylimidazolinium, 1,3-dimethyl-2-heptylimidazolinium, 1,3-dimethyl-2-(3'heptyl)imidazolinium, 1,3-dimethyl-2-dodecylimidazolinium, 1,2,3-trimethyl-1,4,5,6-tetrahydro pyridinium, 1,3-dimethylimidazolium, 1-methyl-3-ethylimidazolium, and 1,3-dimethylbenzimidazolium that have high conductance and are capable of providing a capacitor excellent in impedance performance.

As the base component, it is also possible to use a tertiary amine, and examples of the tertiary amine include trialkylamines (such as trimethylamine, dimethylethylamine, methyldiethylamine, triethylamine, dimethyl-n-propylamine, dimethylisopropylamine, methylethyl-n-propylamine, methylethylisopropylamine, diethyl-n-propylamine, diethylisopropylamine, tri-n-propylamine, triisopropylamine, tri-n-butylamine, and tri-tert-butylamine) and phenyl group-containing amines (such as dimethylphenylamine, methylethylphenylamine, and diethylphenylamine). Especially, trialkylamines are preferable in terms of high conductance, and it is more preferable to add at least one selected from the group consisting of trimethylamine, dimethylethylamine, methyldiethylamine, and triethylamine. As the base component, there may also be used secondary amines such as dialkylamines, primary amines such as a monoalkylamine, or ammonia.

The liquid component may also contain the acid component, the base component, and/or a salt of the acid component and the base component. The salt may be either an inorganic salt or an organic salt. The organic salt is a salt in which at least one of an anion or a cation includes organic matter. As the organic salt, there may be used trimethylamine maleate, triethylamine borodisalicylate, ethyldimethylamine phthalate, mono 1,2,3,4-tetramethylimidazolinium phthalate, or mono 1,3-dimethyl-2-ethylimidazolinium phthalate.

The liquid component has a pH of preferably less than 7, more preferably less than or equal to 5, to suppress dedoping of the dopant for the conductive polymer. Even when the pH of the liquid component is set in the above range to suppress dedoping of the dopant, the first coating layer of the cathode body that contains phosphorus is capable of suppressing degradation of the cathode body. Even when the liquid component contains borodioxalic acid, borodiglycolic acid, or borodisalicylic acid that easily corrodes the first metal, such as aluminum, constituting the base material part of the cathode body, the first coating layer is capable of suppressing degradation of the cathode body.

In the exemplary embodiment described above, a wound electrolytic capacitor has been described. The application range of the present disclosure, however, is not limited to the wound electrolytic capacitor and the present disclosure can also be applied to other electrolytic capacitors such as a chip electrolytic capacitor including a metal sintered body as an anode body, and a stacked electrolytic capacitor including a metal plate as an anode body.

[Method for Manufacturing Electrolytic Capacitor]

Hereinafter, described are steps of one exemplary method for manufacturing the electrolytic capacitor.

A method for manufacturing an electrolytic capacitor according to the present exemplary embodiment includes the steps of, for example, (i) preparing a cathode body that includes a base material part having an outer surface that is roughened surface and has a pore opened at the outer surface, and an inorganic conductive layer covering at least a part of the outer surface; (ii) forming a wound body that includes the cathode body, an anode body having a dielectric layer, and a separator interposed between the cathode body and the anode body; (iii) attaching a phosphorus-containing compound layer to at least a part of inner wall of the pore of the cathode body; (iv) forming a capacitor element by attaching a conductive polymer to cover at least a part of the dielectric layer; and (v) impregnating the capacitor element with a liquid component.

(i) Step of Preparing Cathode Body

Cathode body 22, which has, for example, a cross-sectional structure shown in FIG. 3, is prepared. The cathode body has a film thickness ranging, for example, from 10 μm to 60 μm, inclusive.

The roughening the cathode body can be performed by a publicly known method, and the roughening may be performed by etching, for example. The etching treatment may be performed by, for example, a direct-current electrolytic method or an alternate-current electrolytic method. In terms of easily securing a high capacitance even when repeating charging and discharging, the roughening is preferably performed by etching.

When the cathode body is roughened by etching, an etching reduction amount ranges, for example, from 0.1 mg/cm$^2$ to 4.0 mg/cm$^2$, inclusive, preferably from 0.2 mg/cm$^2$ to 1.0 mg/cm$^2$, inclusive, from a viewpoint of adhesiveness between the conductive polymer and the cathode foil when the capacitor element is impregnated with the liquid component.

In addition, an oxide coating film may be formed on a surface of the cathode body by subjecting the cathode body to an anodizing treatment as necessary. The anodizing treatment can be performed with an anodizing treatment solution. The anodizing treatment can be performed by, for example, applying a plus voltage to a metal foil while the metal foil is immersed in the anodizing treatment solution. At this time, the anodizing treatment may be performed under a temperature condition ranging, for example, from 50° C. to 85° C., inclusive, as necessary.

Examples of the anodizing treatment solution include an aqueous solution containing a salt such as phosphate, adipate, or borate. Examples of phosphate include an ammonium phosphate salt, a potassium phosphate salt, and a sodium phosphate salt. Examples of the ammonium phosphate salt include diammonium monohydrogen phosphate and monoammonium dihydrogen phosphate. As adipate and borate, there can also be exemplified an ammonium salt, a potassium salt, and a sodium salt. The anodizing treatment solution may contain one of these salts or two or more of these salts. It is preferable to use an ammonium phosphate aqueous solution such as a monoammonium dihydrogen phosphate aqueous solution, or an ammonium adipate aqueous solution, from a viewpoint of operability.

Normally, a large metal foil is subjected to the roughening treatment and the anodizing treatment, from a viewpoint of mass productivity. In this case, the treated metal foil is cut into a desired size to prepare the cathode body.

The cathode body obtained by forming the oxide coating film on a main surface of a cathode body and then cutting the cathode body at a predetermined width may be further subjected to an anodizing treatment to form an oxide coating film on an end surface of the cathode body as necessary. In order to form the oxide coating film on the end surface of the cathode body, the cathode body cut at the predetermined width and wound (that is, with end surfaces of the cathode body provided as a top surface and a bottom surface of a wound body) may be subjected to voltage application while immersed in an anodizing treatment solution, for example. The temperature condition for the anodizing treatment can be appropriately selected from the above range. Alternatively, the cathode body that is cut at the predetermined width, to which a lead terminal is connected, and that is then wound may be subjected to an anodizing treatment.

The anodization-treated cathode body may be washed or dried as necessary.

The inorganic conductive layer can be formed by a method such as attaching a powder of conductive inorganic material to a surface of the cathode body or vacuum vapor deposition. Alternatively, the inorganic conductive layer may also be formed by coating a surface of the cathode body with a paste or a slurry containing a conductive inorganic material and a binder to form a coated film, and drying the coated film or removing the binder by subjecting the coated film to a heat treatment.

The inorganic conductive layer including a deposited film of a conductive inorganic material (particularly, conductive carbon such as amorphous carbon) can be formed by depositing the inorganic material and the like on an outer surface layer of the cathode body using, for example, a gas phase method such as chemical vapor deposition, vacuum vapor deposition, sputtering, or ion plating. For example, the inorganic conductive layer containing a metal nitride may be formed by performing the gas phase method in a nitrogen gas atmosphere. As the material for the inorganic conductive layer, there can be exemplified the materials described above.

When the inorganic conductive layer includes a base layer, it is preferable to form the base layer by depositing the conductive inorganic material on a surface of the cathode body using the gas phase method. The inorganic conductive layer may also be formed by forming the base layer on an outer surface of the cathode body as necessary and forming, as described above, a layer containing the conductive inorganic material on the base layer.

(ii) Step of Forming Wound Body

First, an anode body having a dielectric layer, and a separator are prepared.

A metal foil containing a second metal as a raw material for the anode body is prepared and a surface of the metal foil is roughened. By the roughening, a plurality of projections and recesses are formed on the surface of the metal foil. The roughening is preferably performed by subjecting the metal foil to an etching treatment. The etching treatment may be performed by, for example, a direct-current electrolytic method or an alternate-current electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment on the metal foil oxidizes the second metal to form the dielectric layer as an oxide coating film.

The anodizing treatment can be performed with, for example, an anodizing treatment solution. The anodizing treatment can be performed by subjecting the metal foil to a heat treatment while immersing the metal foil in the anodizing treatment solution. At this time, a temperature ranges, for example, from 50° C. to 80° C., inclusive. Alternatively, the anodizing treatment may be performed by applying a voltage to the metal foil while immersing the metal foil in the anodizing treatment solution. Both the heat treatment and the voltage application may be performed in the anodizing treatment. The anodizing treatment solution can be appropriately determined from the solutions described in the anodization for the cathode body.

Normally, a large metal foil is subjected to the roughening treatment and the anodizing treatment, from a viewpoint of mass productivity. In this case, the treated metal foil is cut into a desired size to prepare anode body 21. Cut anode body 21 has the dielectric layer on a main surface of the anode body.

The anode body obtained by forming the dielectric layer on the main surface of an anode body and then cutting the anode body at a predetermined width may be further subjected to an anodizing treatment to form a dielectric layer on an end surface of the anode body as necessary. In order to form the dielectric layer on the end surface of the anode body, the anode body cut at the predetermined width and wound (that is, with end surfaces of the anode body provided as a top surface and a bottom surface of a wound body) may be subjected to a heat treatment while immersed in an anodizing treatment solution. Alternatively, the anode body that is cut at the predetermined width, to which a lead terminal is connected, and that is then wound may be subjected to an anodizing treatment. A heat treatment temperature can be appropriately selected from the above range.

The anodization-treated anode body may be washed or dried as necessary.

Next, a wound body is produced using cathode body 22 obtained in step (i) and anode body 21.

Anode body 21 and the cathode body are wound with separator 23 interposed between the anode body and the cathode body. At this time, the winding can be performed while lead tabs 15A, 15B are rolled in the anode foil, the cathode foil, and the separator, to cause lead tabs 15A, 15B to stand up from the wound body as shown in FIG. 2.

A material for lead tabs 15A, 15B is not particularly limited as long as the material is a conductive material. A material for lead wires 14A, 14B connected to lead tabs 15A, 15B, respectively, is not also particularly limited as long as the material is a conductive material.

Next, fastening tape 24 is disposed on an outside surface of the cathode body positioned at an outermost layer of wound anode body 21, cathode body, and separator 23, to fix an end of the cathode body with fastening tape 24.

In this step, the wound body may be subjected to an anodizing treatment (re-anodizing treatment) to form the dielectric layer on the end surface of the anode body. In addition, the oxide coating film may be formed on the cathode body.

When the anode body is prepared by cutting a large metal foil, the wound body is further subjected to an anodizing treatment to form the dielectric layer on the end surface of the anode body. The anodizing treatment can be performed with an anodizing treatment solution. The anodizing treatment may be performed by, for example, subjecting the wound body to a heat treatment while immersing the wound body in the anodizing treatment solution. Alternatively, the anodizing treatment may be performed by applying a plus voltage to the anode body in the wound body with a third electrode set as an opposite electrode while the wound body and the third electrode are immersed in the anodizing treatment solution. Both the heat treatment and the voltage application may be performed. Anodizing treatment conditions can be appropriately determined from the conditions described in step (ii) and the anodizing treatment solution can be appropriately determined from the solutions described in step (i).

When the cathode body is subjected to the anodizing treatment in this step, the anodizing treatment may be performed by, for example, applying a plus voltage to the cathode body in the wound body with a third electrode set as an opposite electrode while immersing the wound body and the third electrode in the anodizing treatment solution, to oxidize a surface of the cathode body. The anodizing treatment solution and temperature conditions for the anodizing treatment can be appropriately determined from the solutions and the temperature conditions described in step (i), respectively.

The anodizing treatment may be performed while the whole of the wound body is immersed in the anodizing treatment solution or at least the top surface or the bottom surface of the wound body is immersed in the anodizing treatment solution.

The anodization-treated wound body is washed or dried as necessary.

(iii) Step of Attaching Phosphorus Compound Layer to Pores of Cathode Body

Subsequently, a phosphorus-containing compound layer is attached to inside walls of pores of the roughened cathode body. This step can be performed by, for example, impregnating the wound body with a solution containing phosphorus compound and then subjecting the wound body to a heat treatment. This step may also be performed by impregnating the cathode body that has not yet constituted the wound body with a solution containing phosphorus compound and then subjecting the cathode body to a heat treatment. The attachment of the phosphorus compound layer may be performed before formation of a capacitor element (step (iv)).

The impregnation of the wound body or the cathode body with the solution containing phosphorus compound allows the phosphorus compound to infiltrate into the pores of the cathode body. Thereafter, the extracted wound body or cathode body is dried by the heat treatment to attach a phosphorus compound layer to the inner walls of the pores. Examples of the solution containing phosphorus compound include a solution containing phosphoric acid ion such as an aqueous solution containing phosphate. Examples of phosphate include an ammonium phosphate salt, a potassium phosphate salt, and a sodium phosphate salt. Examples of the ammonium phosphate salt include diammonium monohydrogen phosphate and monoammonium dihydrogen phosphate. A heat treatment temperature ranges, for example, from 150° C. to 400° C., inclusive, preferably from 200° C. to 400° C., inclusive.

When the wound body is impregnated with the solution containing phosphorus compound, the impregnation with the solution containing phosphorus compound may be performed in the step of forming the dielectric layer on the end surface of the anode body (end-surface anodization). The anodizing treatment solution that contains a phosphorus compound enables impregnation of the pores with the solution containing phosphorus compound simultaneously and concurrently with the end-surface anodization. Drying the anodized wound body by a heat treatment gives a wound body including the anode body whose end surface is anodized and forms the phosphorus compound layer on the inner walls of the pores of the cathode body. This procedure can also form the phosphorus compound layer on inside walls of pores of the roughened anode body. When the cathode body has been anodized in advance, phosphorus attached to the inner walls is diffused into the anodizing oxide coating film by the heat treatment after the anodization, so that a phosphorus-containing anodizing oxide coating film can be formed along the inner walls of the pores.

When the cathode body is impregnated with the solution containing phosphorus compound, the impregnation with the solution containing phosphorus compound may be performed in the step of anodizing the cathode body. The anodizing treatment solution that contains a phosphorus compound enables impregnation of the pores with the solution containing phosphorus compound simultaneously and concurrently with growth of an oxide coating film on the inside walls of the pores. In this case, the anodization grows a phosphorus-containing oxide coating film. A heat treatment after the anodization can form the phosphorus-containing oxide coating film along the inner walls of the pores.

The attachment of the phosphorus compound layer to the cathode body is preferably performed on the cathode body on an outer surface of which the inorganic conductive layer has been formed. When a crack is present in the inorganic conductive layer, a core material portion of the cathode body may be exposed through the crack. When an exposed portion of the core material portion is in contact with the liquid component, the metal of the core material portion is corroded to cause a rise in ESR.

When the inorganic conductive layer includes the base layer formed on the outer surface of the cathode body and, for example, a conductive carbon layer formed on the base layer, generation of a crack in the conductive carbon layer can expose the base layer to the liquid component. When the liquid component contacts with the base layer, the liquid component oxidizes the base layer to increase resistance of the base layer in some cases. For example, when titanium or titanium nitride is used for the base layer, oxidation of the base layer forms high-resistance titanium dioxide to possibly cause a rise in ESR.

The treatment of attaching the phosphorus compound layer to the cathode body on which the inorganic conductive layer has been formed coats a crack that can be present in the inorganic conductive layer with the phosphorus compound layer. This suppresses degradation of the base layer and/or the core material portion attributed to the crack, so that a low ESR can be maintained.

When the phosphorus compound layer contains an oxide of the base material part, a ratio of a number of phosphorus atoms in the phosphorus compound layer to a total number of metal atoms and oxygen atoms that constitute the base material part in the phosphorus compound layer ranges, for example, from 0.5% at to 10.0 at %, inclusive, preferably from 1.0 at % to 5.0 at %, inclusive.

It is possible to analyze a content of the phosphorus compound (for example, $PO_4^{3-}$) attached to the cathode body by ion chromatography. The content of the phosphorus compound attached to the cathode body ranges, for example, from 3 mg/m$^2$ to 300 mg/m$^2$, inclusive, preferably from 5 mg/m$^2$ to 100 mg/m$^2$, inclusive.

(iv) Step of Forming Capacitor Element that Includes Conductive Polymer

This step attaches a conductive polymer to the wound body. The conductive polymer is attached to cover at least a part of the dielectric layer of anode body 21. Between anode body 21 and cathode body 22, the conductive polymer may be attached as a layer to a surface of the dielectric layer of anode body 21 to form a conductive polymer layer (or a solid electrolyte layer). The attachment of the conductive polymer, however, is not limited to this example. The conductive polymer may also coat at least a part of a surface of separator 23. The conductive polymer may also be formed to fill the pores of the cathode body. As the conductive polymer, it is possible to use the materials described above.

The conductive polymer may be attached to the wound body by a method for applying a solution containing, for example, a monomer, a dopant, and an oxidant to the capacitor element to cause chemical polymerization or electropolymerization on the capacitor element. The conductive polymer may also be attached to the wound body by a method for applying a treatment solution containing the conductive polymer (hereinafter, also simply referred to as a polymer dispersion) to the wound body. It is possible to promptly impregnate the wound body with the polymer dispersion by forming the oxide coating film on the main surface of the cathode body or forming the dielectric layer on the anode body.

A concentration of the conductive polymer contained in the polymer dispersion preferably ranges from 0.5% by mass to 10% by mass, inclusive. An average particle diameter D50 of the conductive polymer preferably ranges, for example, from 0.01 μm to 0.5 μm, inclusive. Here, the average particle diameter D50 is a median diameter in a volume particle size distribution obtained by a particle size distribution measuring apparatus according to dynamic light scattering.

The polymer dispersion contains a liquid dispersion medium and a conductive polymer dispersed in the liquid dispersion medium. The polymer dispersion may be a solution obtained by dissolving the conductive polymer in the liquid dispersion medium, or a dispersion liquid obtained by dispersing particles of the conductive polymer in the liquid dispersion medium. The wound body that has been impregnated with the treatment solution is normally dried to vaporize at least a part of the liquid dispersion medium.

In order to suppress dedoping in the conductive polymer, an acid may be dissolved in the liquid dispersion medium. Preferable examples of the acid include phosphoric acid, sulfuric acid, phthalic acid, benzoic acid, nitrobenzoic acid, salicylic acid, trimellitic acid, and pyromellitic acid.

It is possible to obtain the polymer dispersion by, for example, a method for dispersing the conductive polymer in the liquid dispersion medium or a method for polymerizing a precursor monomer in the liquid dispersion medium and generating particles of the conductive polymer. Preferable examples of the polymer dispersion include poly(3,4-ethylenedioxythiophene) (PEDOT) doped with polystyrenesulfonic acid (PSS). That is, the polymer dispersion preferably contains PEDOT/PSS. Although an antioxidant for the conductive polymer may be added, it is unnecessary to use an antioxidant because PEDOT/PSS little oxidizes.

The liquid dispersion medium may be water, a mixture of water and a nonaqueous solvent, or a nonaqueous solvent. The nonaqueous solvent is not particularly limited, and it is possible to use, for example, a protic solvent or an aprotic solvent. Examples of the protic solvent include alcohols such as methanol, ethanol, propanol, butanol, ethylene glycol, and propylene glycol, formaldehyde, and ethers such as 1,4-dioxane. Examples of the aprotic solvent include amides such as N-methylacetamide, N,N-dimethylformamide, and N-methyl-2-pyrrolidone, esters such as methyl acetate, and ketones such as methyl ethyl ketone.

As a method for applying the polymer dispersion to the wound body (impregnating the wound body with the polymer dispersion), for example, a method for immersing the wound body in the polymer dispersion housed in a container is simple and preferable. Further, ultrasonic vibration may be applied to the wound body or the polymer dispersion while the wound body is immersed in the polymer dispersion. The drying of the wound body that has been picked up from the polymer dispersion is preferably performed at, for example, 50° C. to 300° C. The step of applying the polymer dispersion to the wound body and the step of drying the wound body may be repeated two or more times. Performing these steps a plurality of times can increase coverage of the conductive polymer on the wound body.

The steps described above give capacitor element 10 that includes the conductive polymer attached to cover at least a part of the dielectric layer. The conductive polymer formed on the surface of the dielectric layer practically functions as a cathode material.

(v) Step of Impregnating Capacitor Element with Liquid Component

Subsequently, capacitor element 10 is further impregnated with the liquid component to give an electrolytic capacitor having an excellent repairing function of dielectric layer.

A method for impregnating capacitor element 10 with the liquid component is not particularly limited. For example, a method for immersing capacitor element 10 in the liquid component housed in a container is simple and preferable. The impregnation is preferably performed under a reduced pressure, in an atmosphere ranging, for example, from 10 kPa to 100 kPa, inclusive. As the liquid component, there can be exemplified the materials described above.

(vi) Step of Encapsulating Capacitor Element 10

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, it is possible to use metals such as aluminum, stainless steel, copper, iron and brass, or alloys of these metals.

Next, sealing member 12 formed so as to allow lead wires 14A, 14B to penetrate the sealing member is disposed above capacitor element 10 to encapsulate capacitor element 10 in bottomed case 11. Next, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as shown in FIG. 1. Thereafter, an aging treatment of applying a rated voltage may be performed.

Sealing member 12 is formed of an elastic material containing a rubber component. As the rubber component, it is possible to use, for example, a butyl rubber (IIR), a nitrile rubber (NBR), an ethylene propylene rubber, an ethylene propylene diene rubber (EPDM), a chloroprene rubber (CR), an isoprene rubber (IR), a Hypalon rubber, a silicone rubber, or a fluorine-containing rubber. Sealing member 12 may contain a filler such as carbon black or silica.

Encapsulated capacitor element 10 may be further subjected to an anodizing treatment as necessary to form the dielectric layer on the anode body or form the oxide coating film on the cathode body. The anodizing treatment at this time can be performed with an electrolytic solution. It is possible to perform the anodizing treatment by, for example, applying a plus voltage to the anode body or the cathode body while capacitor element 10 is immersed in the electrolytic solution. At this time, a heating treatment is normally performed together. A heat treatment temperature ranges, for example, from 80° C. to 150° C., inclusive.

EXAMPLES

Hereinafter, the present disclosure is specifically described with reference to examples and comparative examples. The present disclosure, however, is not limited to the examples below.

Example 1

In the present example, a wound electrolytic capacitor (diameter 6.3 mm×length 5.8 mm) having a rated voltage of 35 V and a rated electrostatic capacitance of 56 μF was produced. Hereinafter, a specific method for manufacturing the electrolytic capacitor is described.

An electrolytic capacitor shown in FIG. 1 was produced in a manner described below, and characteristics of the electrolytic capacitor were evaluated.

(1) Production of Capacitor Element (Preparation of Cathode Body)

A 50-μm-thick Al foil was subjected to an etching treatment to roughen a surface of the Al foil. A 20-nm-thick conductive carbon layer as an inorganic conductive layer was formed on the roughed Al foil by vapor deposition.

Next, the Al foil was subjected to an anodizing treatment to form an oxide coating film. The oxide coating film was formed by the anodizing treatment of applying a voltage of 3 V to the Al foil while immersing the Al foil in an ammonium phosphate solution, at 70° C. for 30 minutes. The anodized Al foil was extracted and dried at 300° C. for 5 minutes. Thereafter, the Al foil was cut to prepare a cathode body.

When a cross-section of the cathode body was confirmed, a phosphorus compound layer was formed on inner walls of pores of the cathode body that had been made to be porous. The phosphorus compound layer included the oxide coating film, which had a film thickness of 7 nm. The oxide coating film had a phosphorus concentration of 2 at %.

(Preparation of Anode Body)

A 120-μm-thick Al foil was prepared. The Al foil was subjected to direct-current etching to roughen a surface of the Al foil. Next, the Al foil was subjected to an anodizing treatment to form a dielectric layer (thickness: about 70 nm) and thus give an anode body. The dielectric layer was formed by the anodizing treatment of applying a voltage of 50 V to the Al foil while immersing the Al foil in an ammonium adipate solution, at 70° C. for 30 minutes. Thereafter, the anode body was cut into a predetermined size to prepare an anode body.

(Production of Wound Body)

An anode lead tab and a cathode lead tab to each of which a lead wire was connected were connected to the prepared anode body and the cathode body having the conductor layer on an end surface of the cathode body, respectively. Then, the anode body and the cathode body were wound with a separator interposed between the anode body and the cathode body while the lead tabs were rolled in the anode body, the cathode body, and the separator, and an outside surface was fixed with a fastening tape to produce a wound body.

A dielectric layer was formed mainly on an end surface of the anode body by a re-anodizing treatment of applying a voltage of 50 V to the anode body while immersing the produced wound body in an ammonium adipate solution, at 70° C. for 60 minutes.

(Preparation of Polymer Dispersion)

A mixed solution was prepared by dissolving 3,4-ethylenedioxythiophene and a dopant, or polystyrenesulfonic acid in ion-exchanged water. While the resultant mixed solution was stirred, iron (III) sulfate (oxidant) that had been dissolved in ion-exchanged water was added to the mixed solution to cause a polymerization reaction. After the reaction, the resultant reaction solution was dialyzed to remove unreacted monomers and an excessive oxidant, so that a polymer dispersion was obtained that contained about 5% by mass of polyethylene dioxythiophene doped with polystyrenesulfonic acid.

(Production of Capacitor Element)

The wound body was immersed in the polymer dispersion housed in a predetermined container in a reduced-pressure atmosphere (40 kPa) for 5 minutes, and then the wound body was picked up from the polymer dispersion. Next, the wound body that had been impregnated with the polymer dispersion was dried in a dry furnace at 150° C. for 20 minutes. As described above, the conductive polymer was attached to cover the dielectric layer of the anode body in the wound body and to contact with the conductor layer on the end surface of the cathode body. Thus, a capacitor element was completed.

(Impregnation with Electrolytic Solution)

The capacitor element was impregnated with an electrolytic solution in a reduced-pressure atmosphere (40 kPa). Used as the electrolytic solution was a solution containing PEG (polyethylene glycol), γBL, SL, and mono(ethyldimethylamine) phthalate (solute) at a mass ratio of 25:25:25:25.

(Encapsulation of Capacitor Element)

The capacitor element that had been impregnated with the electrolytic solution was encapsulated to complete an electrolytic capacitor. Thereafter, an aging treatment of applying the rated voltage was performed at 130° C. for 2 hours.

(Evaluation)

An electrostatic capacitance and an ESR value of the resultant electrolytic capacitor were evaluated by following procedures.

First, an initial electrostatic capacitance value $C_0$ (μF) and an initial ESR value $X_0$ (mΩ) at a frequency of 100 kHz were measured using an LCR meter for 4-terminal measurement in an environment at 20° C.

Next, the rated voltage was applied to the electrolytic capacitor at a temperature of 145° C. for 2000 hours, and then an electrostatic capacitance value $C_1$ (μF) and an ESR value $X_1$ (mΩ) were measured by the same method as described above.

Example 2

The cathode body of Example 1 was prepared that, however, included a roughened Al foil not subjected to the anodizing treatment. In the production of the wound body, the wound body was immersed in an ammonium phosphate aqueous solution in place of the ammonium adipate aqueous solution to perform an end-surface anodizing treatment. Thereafter, the wound body was extracted and dried at 150° C. for 30 minutes. Other procedures were performed in the same manner as in Example 1 to produce an electrolytic capacitor, which was evaluated in the same manner.

The cathode body was extracted from the heated and dried wound body for confirmation of a cross-section of the cathode body. It was confirmed that a phosphorus compound layer was attached to inner walls of pores of the cathode body. The phosphorus compound layer had a film thickness of 7 nm. The phosphorus compound layer had a phosphorus concentration of 1.5 at %.

Comparative Example 1

An electrolytic capacitor was produced in the same manner as in Example 1 except that an ammonium adipate aqueous solution was used in place of the ammonium phosphate aqueous solution in the anodization of the cathode body, and the electrolytic capacitor was evaluated in the same manner.

Comparative Example 2

The cathode body of Example 1 was prepared that, however, included a roughened Al foil not subjected to the anodizing treatment. Other procedures were performed in the same manner as in Example 1 to produce an electrolytic capacitor, which was evaluated in the same manner.

Comparative Example 3

The cathode body of Example 1 was prepared that was roughened but on which no inorganic conductive layer was formed. Other procedures were performed in the same manner as in Example 1 to produce an electrolytic capacitor, which was evaluated in the same manner.

Table 1 shows measurement results of the electrostatic capacitances and the ESR values of the electrolytic capacitors in Examples 1 and 2 and Comparative Examples 1 to 3.

TABLE 1

| | Electrostatic capacitance reliability evaluation | | ESR reliability evaluation | |
|---|---|---|---|---|
| | $C_0$ [μF] | $C_1$ [μF] | $X_0$ [mΩ] | $X_1$ [mΩ] |
| Example 1 | 66 | 60 | 18 | 41 |
| Example 2 | 64 | 57 | 19 | 47 |
| Comparative Example 1 | 63 | 53 | 20 | 58 |
| Comparative Example 2 | 63 | 52 | 20 | 60 |
| Comparative Example 3 | 55 | 41 | 21 | 57 |

The electrolytic capacitor in Comparative Example 3 has an electrostatic capacitance lower than the electrostatic capacitances of the other electrolytic capacitors. This is considered to be because no inorganic conductive layer was formed to allow formation of a dielectric layer on inside walls of the cathode body and thus presence of a cathode capacitance. In this case, since the electrostatic capacitance of the electrolytic capacitor is a capacitance derived from a combination of an anode capacitance and the cathode capacitance, the electrostatic capacitance is considered to have been reduced.

On the other hand, the electrolytic capacitors in Comparative Examples 1 and 2 are capable of maintaining high electrostatic capacitances but greatly increase the ESR values after elapse of 2000 hours. This is considered to be because adhesiveness of the conductive polymer layer to the pores was insufficient and the liquid component infiltrated into the pores along with use of the electrolytic capacitor. Hence, the metal of the core material portion of the cathode body was corroded so that the resistance increased.

In contrast, the electrolytic capacitors in Examples 1 and 2 are capable of maintaining high electrostatic capacitances even after elapse of 2000 hours and suppressing a rise in ESR. In comparison between Examples 1 and 2, the electrolytic capacitor in Example 1 that included the oxide coating film containing phosphorus exhibited an ESR value lower than the ESR value of the electrolytic capacitor in Example 2.

The present disclosure is usable in a hybrid-type electrolytic capacitor including a conductive polymer and a liquid component.

What is claimed is:

1. An electrolytic capacitor comprising:
   an anode body including a dielectric layer;
   a cathode body; and
   a conductive polymer layer and a liquid component that are disposed between the anode body and the cathode body, wherein:
   the cathode body includes:
      a base material part having an outer surface that is roughened surface and has a pore opened at the outer surface; and
      an inorganic conductive layer covering at least a part of the outer surface,
   the base material part includes a first coating layer disposed along at least a part of the inner wall of the pore,
   the first coating layer contains phosphorus,
   a second coating layer is disposed along the outer surface of the base material part,
   the inorganic conductive layer covers at least a part of the second coating layer, the first coating layer has a film thickness greater than a film thickness of the second coating layer, the second coating layer contains phosphorus, and the first coating layer has a phosphorus concentration higher than a phosphorus concentration of the second coating layer.

2. The electrolytic capacitor according to claim 1, wherein:

the first coating layer contains an oxide of a first metal, and phosphorus, and the second coating layer contains an oxide of the first metal.

3. The electrolytic capacitor according to claim 1, wherein the inorganic conductive layer has a phosphorus-attached region on an outer surface of the inorganic conductive layer.

4. The electrolytic capacitor according to claim 1, wherein the inorganic conductive layer contains conductive carbon.

5. An electrolytic capacitor comprising:

an anode body including a dielectric layer;

a cathode body; and a conductive polymer layer and a liquid component that are disposed between the anode body and the cathode body, wherein:

the cathode body includes:

a base material part having an outer surface that is roughened surface and has a pore opened at the outer surface; and an inorganic conductive layer covering at least a part of the outer surface, the base material part includes a first coating layer disposed along at least a part of inner wall of the pore, the first coating layer contains phosphorus, a second coating layer is disposed along the outer surface of the base material part, the inorganic conductive layer covers at least a part of the second coating layer, and the first coating layer has a film thickness greater than a film thickness of the second coating ager, the first coating layer contains an oxide of a first metal, and phosphorus, and the second coating layer contains an oxide of the first metal.

6. The electrolytic capacitor according to claim 5, wherein the inorganic conductive layer has a phosphorus-attached region on an outer surface of the inorganic conductive layer.

7. The electrolytic capacitor according to claim 5, wherein the inorganic conductive layer contains conductive carbon.

* * * * *